March 20, 1928.
E. H. REMDE
1,663,140
INDUSTRIAL TRUCK
Filed Dec. 31, 1924
2 Sheets-Sheet 1
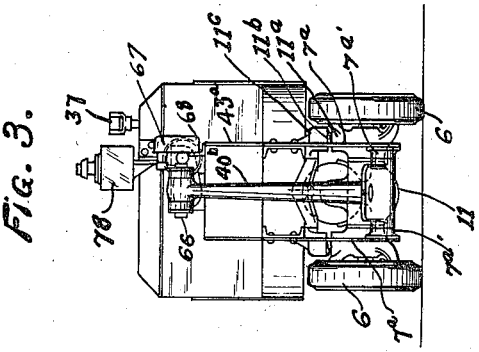
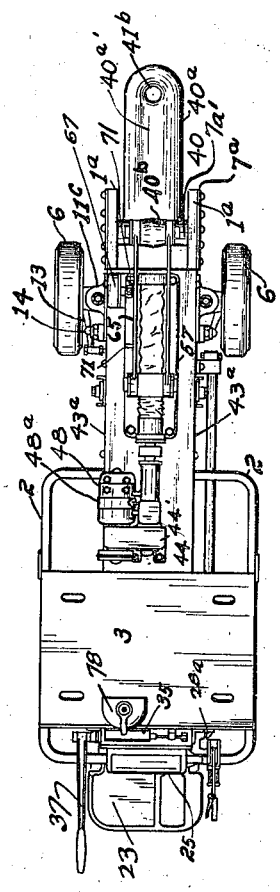
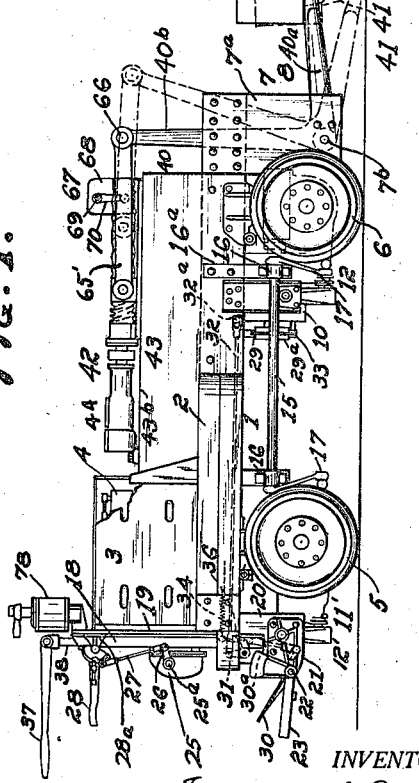
INVENTOR.
Edward H. Remde
BY Edward R. Alexander
ATTORNEY.

March 20, 1928.
E. H. REMDE
1,663,140
INDUSTRIAL TRUCK
Filed Dec. 31, 1924
2 Sheets-Sheet 2
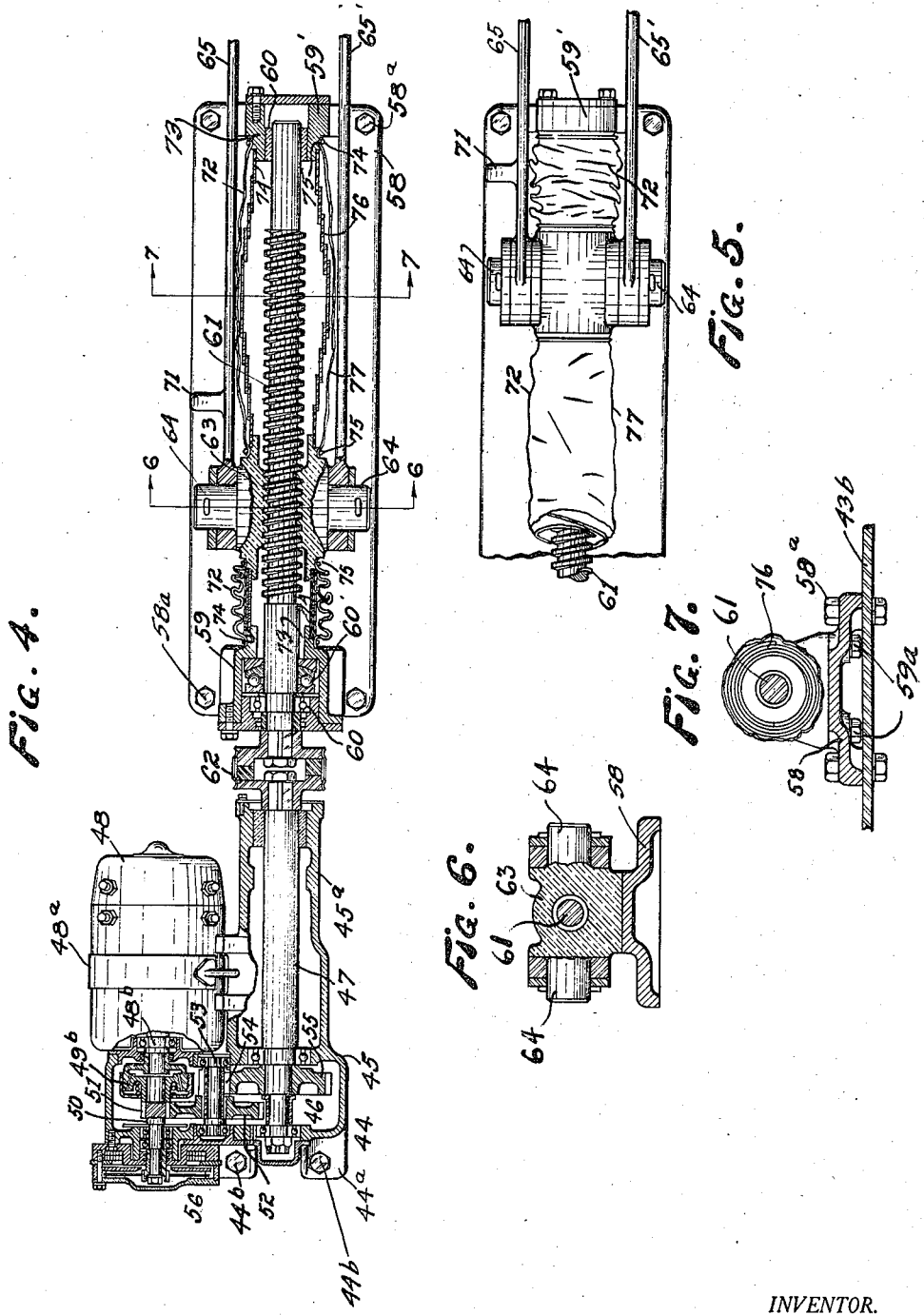
INVENTOR.
Edward H. Remde
BY
Edward R. Alexander
ATTORNEY.

Patented Mar. 20, 1928.

1,663,140

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed December 31, 1924. Serial No. 759,026.

This invention relates to an industrial truck capable of engaging and operating vehicles commonly know as trailers.

One object of the invention is to provide a tractor with improved mechanism for engaging the trailer, whereby the latter may be pulled or pushed from place to place in a ready manner.

Another object of the invention is to provide an improved mechanism so constructed that it may operate, when moved to engage the trailer, to lift one end of the latter, thereby adapting the mechanism for use in connection with trailers of the two-wheeled type.

A further object of the invention is to provide improved means for protecting the operating parts of the connecting means to insure long life and efficient lubrication thereof.

Other objects of the invention will be apparent to those skilled in the art to which my invention relates from the following description taken in connection with the accompanying drawings, wherein Fig. 1 is a side view of a truck or tractor and a trailer, and the connecting means between them embodying my invention.

Fig. 2 is a top plan view of the tractor.

Fig. 3 is an end view of the tractor.

Fig. 4 is a view, partly in section, of the power mechanism and the operating means for the connecting means.

Fig. 5 is a fragmentary plan of parts shown in Fig. 4, with parts of the operating means in the position they occupy when the trailer is disengaged, as shown in dotted lines in Fig. 1.

Fig. 6 is a section on the line 6—6 of Fig. 4.

Fig. 7 is a section on the line 7—7 of Fig. 4.

In the drawings, 1 indicates a frame of any desired construction, preferably formed from angle or channel bars suitably connected in rigid relation. The frame 1 may comprise a pair of spaced longitudinally extending channel bars 1$^a$ connected by suitable cross members and a pair of U-shaped channel members 2 arranged on opposite sides of the longitudinal members 1$^a$ at or near the forward ends thereof and forming with the longitudinal members a relatively wide frame section to support a source of power supply, which in the present illustrated form of construction is shown as consisting of a plurality of electric storage batteries 4. The source of power may be covered by a sheet metal casing 3. The numerals 5, 6, indicate front and rear wheels for supporting the frame 1, there preferably being provided a pair of front wheels 5 and a pair of rear wheels 6 of the same size and tread. The U-shaped members 2 preferably extend laterally beyond the plane of the wheels so as to protect them in the operation of the tractor.

7 indicates a support depending from the rear end of the frame 1, preferably at a point beyond the rear wheels 6, and adapted to support a connecting means, indicated as an entirety at 8, for connecting the tractor to a trailer 9, whereby the latter may be pulled or pushed from place to place. The support 7 preferably comprises a pair of plates 7$^a$ riveted or otherwise secured to the web portions of the channel bars 1$^a$ and depending therefrom in parallel relation. At their lower ends and near their outer edges, the plates 7$^a$ are provided with aligned bearings to receive and support the opposite ends of a shaft 7$^b$, which forms a fulcrum, as will later appear. The bearings for the shaft 7$^b$ constitute openings formed in the plates 7$^a$, and these openings are preferably reinforced by collars 7$^{a'}$ secured concentrically of the bearing openings in a well-known manner. By preference the longitudinal bars 1$^a$ are arranged so that their channels oppose each other, this arrangement permitting the plates 7$^a$ to be secured to the outer faces of the webs of the bars and thus spaced apart the maximum distance, and also permitting the front ends of the bars 1$^a$ and the adjacent ends of the U-shaped bars 2 to be connected in rigid relation in a simple manner.

Either or both pairs of wheels 5, 6, may be driven and either or both pairs thereof may be mounted to swing about vertical axes for steering purposes. In the illustrated form of construction, both pairs of wheels are steerable and the rear pair thereof are driven by a motor 10, preferably of the electric type, so as to receive current from the electric batteries 4. 11 indicates an axle mechanism between the motor 10 and wheels 6, the casing of the motor being preferably rigidly connected to the housing of the axle mechanism 11, so that both may be suspended as a unit by suitable suspension mechanism indicated as an entirety at 12. 11ª indicates seats for the lower ends of suitable coiled springs 11ᵇ interposed between the housing for the axle mechanism 11 and frame 1. These seats 11ª are aligned with casings 11ᶜ carried by the frame 1, which casings form seats for the upper ends of the springs 11ᵇ. The casings 11ᶜ may comprise inverted cups, each formed integrally with a bracket that is rigidly secured to the adjacent channel bar 1ª.

The axle for the wheels 5 comprises a casting 11' having laterally extending members to which the wheels 5 are pivoted by suitable knuckle joints, whereby they may be operated for steering.

The casting 11' has a shape substantially corresponding to the housing for the axle mechanism 11 so that a suspension mechanism 12' similar to that employed for the latter may be used. The motor 10, axle mechanism 11, casting 11', and suspension mechanisms 12, 12', and also the pivot connections between the axle mechanism 11 and casting 11' and wheels 6, 5, respectively, are preferably substantially similar to like elements and mechanisms disclosed in a copending application filed jointly by myself and John H. Hertner, Serial No. 420,630 (see Letters Patent No. 1,628,145), for which reason a detail illustration and a description thereof will not be necessary herein.

The steering connections between the pairs of wheels preferably comprise the following instrumentalities: 13 indicates an arm connected to the spindle of each wheel, the arm for one wheel being connected by a tie-rod 14 to the arm of the other wheel of the pair. 15 indicates a rocker extending along one side of the frame 1 and rotatively supported by spaced bearings 16, each bearing preferably comprising a strap 16ª fixed to a bracket 16ᵇ depending from the adjacent longitudinal bar 1ª, as shown in Fig. 1. 17 indicates levers connected to the rocker 15 and operated thereby and each pivotally connected at its lower free end to the adjacent arm 13 connected to one of the wheels or the tie-rod for the adjacent pair of wheels. The levers 17 may be connected to the rocker 15 on the outer sides of the strap 16ª so that through their engagement therewith they will prevent endwise movement of the rocker 15 in its bearings.

18 indicates a pair of uprights disposed at the front end of the frame and preferably rigidly connected to the longitudinal bars 1ª. The uprights 18 extend above the frame 1 to provide a suitable support for a dash 19; they also extend below the frame 1 and form a support for a pair of plates 20, which in turn support a pair of brackets 21. 22 indicates a shaft rotatably mounted at its opposite ends in the brackets 21. 23 indicates a platform or base connected with the shaft 22 and adapted to be supported in horizontal position as shown in Fig. 1. By mounting the platform on the shaft 22, it may be swung upwardly when the tractor is not in use, a counterweight being preferably employed to hold the platform in its non-use position. 25 indicates as an entirety a controller for the motor 10. The controller is mounted in a suitable casing which may be supported upon the uprights 18. The shaft 25ª of the controller is connected by an arm 26 and link 27 to a handle 28, pivotally mounted upon a bracket 28ª secured to the dash 19.

29 indicates a braking mechanism preferably engaging a driven element of the motor 10 such as a brake wheel 29ª connected to the motor shaft, to stop the tractor or to hold it against movement. The braking mechanism may comprise the following instrumentalities: 30 indicates a foot pedal pivotally mounted upon the shaft 22 and operatively connected to a link 30ª which in turn is connected to a bell crank 31. 32 indicates a link or rod connected at one end to the bell crank 31 and at its opposite end connected to a system of levers 32ª which in turn operate the brake shoes 33 into and out of engagement with the brake wheel 29ª, the latter being mounted on an extended end of the shaft of the motor 10. 34 indicates a spring connected at one end to the frame 1 and at its opposite end connected to the link or rod 32 and normally tending to apply the brake shoes 33. The spring 34, when acting to apply the brake shoes, will swing the foot pedal 30 to the position shown in Fig. 1; accordingly, it will be seen that when the operative (who stands on the platform 23 to operate the tractor) pushes the pedal downwardly, the brake mechanism will be operated, in opposition to the tension of the spring 34 to release the brake shoes, thereby permitting the driving of the truck or tractor from place to place.

35 indicates an automatic switch mechanism connected by a rod 36 to the braking mechanism 29 and operated thereby to open the circuit to the motor 10 when the brake shoes 33 are applied and to close the circuit when the brake shoes are released. The switch mechanism 35 may also be interconnected with the controller 25 or a movable element thereof to prevent closing of the circuit by the operation by the controller operating handle 28 in the event the pedal 30 has not been operated to release the brake shoes or the closing of the circuit and the operation of the motor 10 in the event the pedal 30 is released while the controller handle is in its "on" position and thereafter the foot pedal is operated or depressed to release the brake, this interconnection thereby making it necessary to return the controller to neutral position before the motor circuit can be closed.

The steering connections already referred to are operated by a lever 37 preferably pivoted to a vertical rod 38 rotatably mounted in suitable bearings supported by brackets secured to one of the uprights 18. The lower end of the rod 38 carries an arm which in turn is pivotally connected to an arm extending from the spindle of the adjacent wheel 5. Accordingly, the operation of the lever 37 will swing all of the wheels simultaneously through the steering connections already described; these connections being so arranged that the pairs of wheels will be swung in opposite directions relative to each other to insure steering in relatively small areas.

The trailer 9 may be of any desired construction and size, but preferably comprises a box body $9^a$ adapted to receive and hold the bodies or materials to be transported. The body $9^a$ may be supported by two or more wheels $9^b$, but in the illustrated form of construction it is supported by a single pair of wheels disposed near its rear end and its front end is supported by one or more legs 39. When the trailer is supported in this manner, the means 8 for connecting the trailer to the tractor operate to lift the front end of the trailer 9 off the floor (that is, to dis-engage the leg or legs 39 therefrom) and to support such end while the trailer is being pulled or pushed by the tractor. While the illustrated form of construction is provided for economical reasons, it will be obvious that the leg or legs may be substituted by one or a pair of wheels, rollers or castors, as desired. The wheels $9^b$ are mounted upon an axle $9^c$.

Of the means 8 for connecting the tractor and trailer, 40 indicates a member pivotally mounted on the transverse shaft $7^b$ and having an outwardly extending arm $40^a$ adapted to be projected below and into lifting relation to the under side of the trailer 9, so as to engage therewith and lift its front end to dis-engage the leg or legs 39 from the floor. $40^b$ indicates an upstanding power arm, having fixed angular relation to the arm $40^a$, being preferably formed integrally therewith. The member 40 is formed with a transverse opening through which the transverse shaft $7^b$ extends, this opening being preferably disposed at the angle between the arms $40^a$, $40^b$. 41 indicates interlocking means between the arm $40^a$ and trailer 9 and arranged to automatically engage when the arm $40^a$ is operated upwardly and to automatically dis-engage when the arm is operated downwardly. The interlocking means 41 may comprise a pin carried by one of the parts and walls of an opening formed in the other part; for example, I provide a pin $41^a$ rigidly secured to and depending from the bottom of the trailer 9 near its front end and substantially midway between its sides and form in the outer portion of the arm $40^a$ an opening $41^b$ of a size to receive the pin $41^a$, so that when the arm $40^a$ is operated about the shaft $7^b$, upwardly, the pin will project into the opening $41^b$, as shown in Fig. 1.

The arm $40^a$ preferably comprises a relatively wide plate or bar and its upper surface is formed with a channel or guide trough $40^{a'}$ leading outwardly to the opening $41^b$ and serving to guide the pin $41^a$ thereinto. Thus it will be seen that the tractor may be moved to position the arm $40^a$ under the trailer with the opening inwardly of the pin $41^a$; then as the arm $40^a$ is swung upwardly, the tractor may be moved outwardly; as a result of these movements, the pin $41^a$ will automatically be guided by the walls of the channel $40^{a'}$ into the opening $41^b$. The arm $40^a$ may have a width substantially equal to the space between the bearings carried by the plates $7^a$ or the re-inforcing collars therefor, thereby providing a relatively long bearing for the member 40 to swing on and preventing endwise movement thereof by its engagement with the plates $7^a$.

42 indicates as an entirety a power mechanism operating through an operating means (indicated as an entirety at 57) to be later described to swing or rock the combined connecting and lifting member 40 to raise and lower the free end of its arm $40^a$, whereby the latter lifts the front end of the trailer 9 and also connects it and the tractor together so that the driving of the tractor will pull or push the trailer in one direction or the other, or lowers such end to effect their dis-connection. Of these means, 43 indicates a bed mounted on the frame 1 rearwardly of the battery housing 3 and of a height to support the operating means, to be later referred to, horizontally in a plane substantially cutting the upper end of the arm $40^b$. The bed 43 may be constructed in any desired manner but preferably comprises a pair of side walls $43^a$ overlapping the bars $1^a$ and riveted thereto along their lower edges and a transverse plate $43^b$ connected to the upper edges of the walls $43^a$. 44 indicates a casing having a plurality of feet $44^a$ secured by cap screws $44^b$ to the bed 43. The casing 44 comprises a main section 45 enclosing a suitable reduction gearing 46 and a tubular section $45^a$ for a propeller shaft 47. The casing 44 is closed by cover $44'$. 48 indicates a motor, preferably of the electric type, rigidly connected to the casing 44 by a suitable clamping means, for example, a strap or band $48^a$, the motor being supplied with current from the batteries 4. The shaft $48^b$ of the motor 48 is operatively connected to a friction clutch 49ᵇ and transmits its power therethrough to a shaft 50, to which is secured a pinion 51. The pinion 51 meshes with a gear 52 mounted on a counter-shaft 53, which in turn carries a pinion 54 meshing with a gear 55 on the inner end of the propeller shaft 47. The shafts 50, 53 and 47 are mounted in suitable bearings in a well-known manner. The clutch 49 may be of any well-known type capable of slipping where the load exceeds a pre-determined amount; furthermore, the elements of the clutch may be adjustable for different maximum loads, as desired. 56 indicates a magnetically operated clutch connected to and associated with the outer end of the shaft 50. The elements of the clutch are operated in one direction by a spring which normally acts on the elements to brake the rotation of the shaft or hold it against movement. The winding of the electro-magnet for the clutch is connected in series with the motor 48 so that when current is supplied thereto, the clutch will be released. As this clutch mechanism forms the subject-matter of a separate co-pending application, no claims thereto are made herein and it will not be necessary to illustrate and describe the same in detail in this application.

Of the operating means 57, 58 indicates a base rigidly secured by a plurality of cap screws 58ᵃ to the bed 43 and arranged rearward of the power mechanism 46 and motor 48. 59, 59′, indicate a pair of bearing boxes positioned at or near the opposite ends of the base 58 and secured thereto by cap screws 59ᵃ (see Fig. 7) and preferably arranged in axial alignment with the propeller shaft 47. The bearing 60 in the box 59′ may comprise a bronze sleeve; whereas the bearing 60′ in the box 59 preferably comprises a ball-bearing capable of taking thrusts of the load when the front end of the trailer 9 is being lifted or lowered, as already described. The bearings 60, 60′, support a screw 61 connected at its inner end by a flexible joint 62 with the outer end of the propeller shaft 47. 63 indicates a nut threaded on the screw 61. 64, 64, indicate pins projecting from the opposite sides of the nut 63 and forming pivots for the inner ends of thrust members or rods 65, 65′.

The outer ends of the members or rods 65, 65′, are disposed upon opposite sides of the arm 40ᵇ and are pivotally connected thereto by a bolt or pin 66. As shown in Figs. 1 and 3, the opening for the bolt or pin 66 extends transversely through the arm 40ᵇ at or adjacent its upper free end so as to permit the application of maximum leverage thereon. The thrust rods 65, 65′, may be locked on the pins 64 and bolt 66 by washers and cotter pins.

67 indicates as an entirety a limit switch mechanism for stopping the motor 48 when driven in either direction upon movement of the nut 63 to a pre-determined position as a result of the rotation of the screw 61. The limit switch mechanism 67 comprises two pairs of contacts through one of which current flows to the motor 48 to effect driving thereof in either direction. The pairs of contacts are mounted in a casing 68 supported by an angle plate on the bed 43. 69 indicates a shaft provided on its outer end with a crank arm 70. The inner end of the shaft is provided with suitable operating devices arranged to engage one contact of either pair when the shaft is rocked in one direction. The free end of the crank arm 70 is disposed in the path of movement of a pair of lugs 71 spaced apart and extending laterally from the adjacent thrust link or rod 65 so that one or the other thereof will engage the arm and rock the shaft 69 accordingly as the nut moves in one direction or the other. The lugs 71 are preferably positioned so as to cut out the current to the motor 48 in the event the combined connecting and lifting member 40 is moved in either direction to a position beyond that shown in full and dotted lines in Fig. 1. The limit switch mechanism will therefore prevent lifting of the trailer 9 unduly when the arm 40ᵃ swings upwardly and will prevent damage due to its contact with the floor when the arm 40ᵃ is operated in the downward direction.

72 indicates as an entirety a hood or boot for enclosing the screw 61 thereby preventing foreign matter lodging between the nut 63 and screw 61 and the bearings for the latter or becoming mixed with the lubricant for these parts and thus increasing wear thereon. I preferably provide an enclosing hood or boot between each side of the nut and the adjacent bearing box, this arrangement leaving the nut 63 exposed for connection with the thrust links and unobstructed movement of the latter. For this purpose, each end of the nut 63 and the opposing end of the bearing box 59 or 59′ is provided with a collar 73 having stepped annular walls forming seats 74, 75. The opposing seats 74 receive and support the opposite ends of a coiled expansion spring 76 and the opposing seats 75 receive and support the opposite ends of a sleeve 77 formed from flexible material, such as cloth, canvas, rubber and the like, the ends of the sleeve being preferably secured to the seats by sections of wire or other clamping means. The sleeve 77 is formed of a material that is capable of keeping out foreign matter, for purposes already described, whereas the purpose of the spring 76 is to maintain all portions of the sleeve out of contact with the screw 61 at all times. By using coiled springs, they accommodate themselves to the varying positions of the nut relative to both bearing boxes at all times while maintaining the sleeve out of contact with and in substantially concentric relation to the screw 61. I prefer to use a coiled spring formed from flat stock having coils leading from the center portion of the stock outwardly. In this form of construction, the convolutions of the spring have an overlapping relation when compressed and will thus occupy less space than would be required for a coiled spring of the usual type.

My construction of tractor is relatively simple; at the same time I am able to engage and lift one end of a trailer in a ready and positive manner. In my construction, the connecting and lifting member for the trailer is provided with relatively long arms, one serving as a work arm to engage and lift the trailer and connect it to the tractor and the other serving as a power arm, thereby insuring maximum leverage. I also mount the operating means for applying power to the power arm 40ᵇ in a plane that is at substantially right angles to the power arm when in the position it occupies when supporting the end of the trailer in elevated position, so that maximum power is applied to the lifting and connecting member when it is supporting the maximum load. As the front end of the trailer is lifted by the arm 40ᵃ to effect a connection between the tractor and the trailer, it will be seen that the weight of the load is utilized at all times to maintain the pin 41ᵃ in the opening 41ᵇ.

78 indicates a controller for controlling the supply of current to the motor 48. The controller 78 is preferably mounted on the dash 19 within reach of the operative standing on the platform 23.

To those skilled in the art to which my invention relates, many changes and modifications in construction and widely differing embodiments and applications of the invention will suggest themselves without departing from the spirit and scope thereof. My disclosures and the description herein are purely illustrative and not intended to be in any sense limiting.

What I claim is:

1. In apparatus of the class described, the combination of a truck frame, supporting wheels therefor, means for driving certain of said wheels, a combined connecting and lifting device pivotally mounted at the rear end of said frame and having an outwardly extending arm adapted to be projected into lifting relationship with a trailer and an upwardly extending arm, and means connected to the latter arm for swinging said device to lift said trailer and to connect it and said frame together.

2. In apparatus of the class described, the combination of a truck frame, supporting wheels therefor, means for driving certain of said wheels, a combined connecting and lifting device pivotally mounted at the rear end of said frame and having an outwardly extending arm adapted to be projected into lifting relationship with a trailer and an upwardly extending arm, and means connected to the latter arm for swinging said device to lift said trailer and connect it and said frame together, said outwardly extending arm being provided with an element which interengages with an element on the trailer when said device is operated.

3. In apparatus of the class described, the combination of a truck frame, supporting wheels therefor, means for driving certain of said wheels, a combined connecting and lifting device pivotally mounted at the rear end of said frame and having an outwardly extending arm and adapted to be projected into lifting relationship with a trailer and an upwardly extending arm, a screw supported at its opposite ends on said frame, a power means for rotating said screw, a nut on said screw, and a link pivotally connected to said nut and said upwardly extending arm.

4. In apparatus of the class described, the combination of a frame, supporting wheels therefor, means for driving certain of said wheels, a device swingably mounted at one end of said frame and having an outwardly extending arm formed with an opening in its free end to receive an element carried by a trailer and guide walls extending from a point inwardly of said opening to the latter, and means on said frame for operating said device.

5. In apparatus of the class described, the combination of a frame, supporting wheels therefor, means for driving certain of said wheels, a device swingably mounted at the rear end of said frame and comprising a lifting and connecting arm and a power arm, operating means on said frame connected to the free end of said power arm, and means provided on the outer end of said lifting and connecting arm arranged to interlock with an element on the trailer to be engaged, said lifting and connecting arm being provided with guides for the interlocking element on the trailer extending from a point remote from the free end of the arm longitudinally to the interlocking element carried by it.

6. In apparatus of the class described, the combination of a frame, front and rear supporting wheels therefor, means for driving certain of said wheels, a pair of plates depending from the rear end of said frame at a point beyond the rear supporting wheels, a device swingably mounted between said plates on a shaft disposed near the lower ends thereof and supported thereby, said device comprising a laterally extending connecting arm and an upwardly extending power arm, and operating means on said frame connected to the free end of said power arm and operating therethrough to swing said connecting arm upwardly to lift the trailer and connect the latter and said frame together.

7. In apparatus of the class described, the combination of a frame, front and rear supporting wheels therefor, means for driving certain of said wheels, a pair of plates depending from the rear end of said frame at a point beyond the rear supporting wheels, a device swingably mounted between said plates on a shaft disposed near the lower ends thereof and supported thereby, said device comprising a laterally extending connecting arm and an upwardly extending power arm, and operating means on said frame connected to the free end of said power arm and operating therethrough to swing said connecting arm upwardly to lift the trailer and connect the latter and said frame together, said connecting arm being formed in its free end with an opening to receive a projection on the trailer when the arm is operated.

8. In apparatus of the class described, the combination of a frame, front and rear supporting wheels therefor, means for driving certain of said wheels, a pair of plates depending from the rear end of said frame at a point beyond the rear supporting wheels, a device swingably mounted between said plates on a shaft disposed near the lower ends thereof and supported thereby, said device comprising a laterally extending connecting arm and an upwardly extending power arm, and an operating mechanism having an element connected to the upper end of said power arm and movable in a plane that is approximately at right angles to the path of movement thereof.

9. In apparatus of the class described, the combination of a frame, front and rear supporting wheels therefor, means for driving certain of said wheels, a pair of plates depending from the rear end of said frame at a point beyond the rear supporting wheels, a device swingably mounted between said plates on a shaft disposed near the lower ends thereof and supported thereby, said device comprising a laterally extending connecting arm and an upwardly extending power arm, a power means, and an operating mechanism having an element connected to the upper end of said power arm and movable in a plane that is approximately at right angles to the path of movement thereof, said operating mechanism comprising a screw supported at its opposite ends and connected to said power means, a nut operated by said screw and a link pivotally connected to said nut and the upper end of said power arm.

10. In apparatus of the class described, the combination of a frame, front and rear supporting wheels therefor, means for driving certain of said wheels, supporting means depending from the rear end of said frame at a point beyond the rear supporting wheels, a device swingably mounted on a shaft disposed near the lower portion of said supporting means and supported thereby, said device comprising a laterally extending connecting arm and an upwardly extending power arm, and an operating mechanism having an element connected to the upper end of said power arm and movable in a plane that is approximately at right angles to the path of movement thereof, said operating mechanism comprising a screw supported at its opposite ends in bearings and a nut operatively connected to said power arm, and an enclosing hood for said screw between said nut and each bearing.

11. In apparatus of the class described, the combination of a frame, front and rear supporting wheels therefor, means for driving certain of said wheels, supporting means depending from the rear end of said frame at a point beyond the rear supporting wheels, a device swingably mounted on a shaft disposed near the lower portion of said supporting means and supported thereby, said device comprising a laterally extending connecting arm and an upwardly extending power arm, and an operating mechanism having an element connected to the upper end of said power arm and movable in a plane that is approximately at right angles to the path of movement thereof, said operating mechanism comprising a screw supported at its opposite ends in bearings and a nut operatively connected to said power arm, an enclosing hood for said screw between said nut and each bearing, and means within each said hood and supported by said nut and bearing for maintaining the hood in expanded position.

12. In apparatus of the class described, the combination of a frame, front and rear supporting wheels therefor, means for driving certain of said wheels, supporting means depending from the rear end of said frame at a point beyond the rear supporting wheels, a device swingably mounted on a shaft disposed near the lower portion of said supporting means and supported thereby, said device comprising a laterally extending connecting arm and an upwardly extending power arm, and an operating mechanism having an element connected to the upper end of said power arm and movable in a plane that is approximately at right angles to the path of movement thereof, said operating mechanism comprising a screw supported at its opposite ends in bearings and a nut operatively connected to said power arm, an enclosing hood for said screw between said nut and each bearing, and an expansion spring within each said hood and supported by said nut and bearing for maintaining the hood in expanded position.

13. In apparatus of the class described, the combination of a frame, front and rear supporting wheels therefor, means for driving certain of said wheels, a bed on the rear portion of said frame, a support disposed rearward of and depending from the rear end of said frame, a device swingably mounted on the lower end of said support, said device comprising a laterally extending lifting and connecting arm and a power arm extending upwardly to a point above said bed, and means on said bed connected with said power arm for swinging said device.

14. In apparatus of the class described, the combination of a frame, front and rear supporting wheels therefor, means for driving certain of said wheels, a bed on the rear portion of said frame, a support disposed rearward of and depending from the rear end of said frame, a device swingably mounted on the lower end of said support, said device comprising a laterally extending lifting and connecting arm and a power arm extending upwardly to a point above said bed, power means on said bed, a screw mounted on said bed and connected to the shaft of said power means, a nut engaging said screw and operated thereby along said bed, and a pair of thrust links pivotally connected to said nut and said power arm.

15. In apparatus of the class described, the combination of a screw and a nut, means for driving one of said elements, a pair of abutment members disposed at opposite sides of said nut, and flexible enclosure means between each side of said nut and the adjacent abutment member.

16. In apparatus of the class described, the combination of a screw and a nut, means for driving one of said elements, a pair of abutment members disposed at opposite sides of said nut, and resilient enclosure means between each side of said nut and the adjacent abutment member.

17. In apparatus of the class described, the combination of a screw and a nut, means for driving one of said elements, a pair of abutment members disposed at opposite sides of said nut, flexible enclosure means between each side of said nut and the adjacent abutment member, and expansible means within one of said enclosure means for maintaining it out of contact with said screw.

18. In apparatus of the class described, the combination of a stationary member and a movable member, a driven element extending through said members, for operating said movable member and a flexible device supported between said members and enclosing said driven element.

19. In apparatus of the class described, the combination of a stationary member and a movable member, a driven element extending through said members, for operating said movable member and a flexible device supported between said members and enclosing said driven element, and expansible means within said device and engaging said members and maintaining it out of contact with said driven element.

In testimony whereof, I have hereunto subscribed my name.

EDWARD H. REMDE.